United States Patent
Nozaki et al.

(10) Patent No.: US 7,419,452 B2
(45) Date of Patent: Sep. 2, 2008

(54) CONTROL APPARATUS OF VEHICULAR AUTOMATIC TRANSMISSION

(75) Inventors: Kazutoshi Nozaki, Aichi-gun (JP); Atsushi Honda, Seto (JP); Akiharu Abe, Toyota (JP); Hirofumi Ota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 235 days.

(21) Appl. No.: 11/478,730

(22) Filed: Jul. 3, 2006

(65) Prior Publication Data

US 2007/0021260 A1    Jan. 25, 2007

(30) Foreign Application Priority Data

Jul. 22, 2005   (JP) ............................. 2005-212873

(51) Int. Cl.
  *F16H 31/00*   (2006.01)
(52) U.S. Cl. .................. 475/123; 475/119; 475/120; 475/121; 475/128; 475/133; 475/134; 477/125; 477/906
(58) Field of Classification Search .................. None
  See application file for complete search history.

(56) References Cited

U.S. PATENT DOCUMENTS

| | | | |
|---|---|---|---|
| 5,865,704 A * | 2/1999 | Takagi et al. ................ | 477/62 |
| 6,299,560 B1 * | 10/2001 | Fujioka et al. .............. | 475/119 |
| 6,398,684 B1 | 6/2002 | Kaizu | |
| 7,104,910 B2 | 9/2006 | Morise et al. | |

FOREIGN PATENT DOCUMENTS

| | | |
|---|---|---|
| DE | 100 45 556 | 4/2001 |
| DE | 600 03 348 | 12/2003 |
| DE | 10 2004 032 007 | 3/2005 |
| EP | 1 033 510 | 9/2000 |
| JP | 9-210196 | 8/1997 |
| JP | 2000-104811 | 4/2000 |
| JP | 2000-249219 | 9/2000 |
| JP | 2005-163916 | 6/2005 |
| KR | 10 1995 0031612 | 12/1995 |

\* cited by examiner

*Primary Examiner*—David D. Le
(74) *Attorney, Agent, or Firm*—Oblon, Spivak, McClelland, Maier & Neustadt, P.C.

(57) ABSTRACT

At the time of a failure in the second group of engagement devices, the manner of input of oil pressures to a fail-safe valve group is changed via a priority degree switching valve on the basis of the state of engagement of engagement devices of the first group in such a manner that the predetermined degrees of priority for the supply of one of oil pressures PC4, PB1 output from linear solenoid valves SL4, SL5 to a corresponding one of a clutch C4 and a brake B1 via the fail-safe valve group are changed so as to avoid an event that the fail-safe gear stage established in order to prevent the occurrence of interlock of the automatic transmission involves a downshift of two or more stages from the speed change stage maintained immediately prior to the occurrence of the failure. Therefore, it is possible to prevent the occurrence of an uncomfortable behavior of the vehicle caused by the shift to the fail-safe gear stage.

8 Claims, 13 Drawing Sheets

FIG. 2

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  | O |  |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

O : ENGAGED (O) : ENGAGED AT ENGINE BRAKE

FIG. 7

| 2nd | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | ○ | | | | ○ | | |
| C2 ON ABNORMALITY | ○→× | ●→○ | | | ○ | C2-B1 | 8th |
| C3 ON ABNORMALITY | ○ | | ●→○ | | ○→× | C1-C3 | 3rd |
| C4 ON ABNORMALITY | ○ | | | ●→○ | ○→× | C1-C4 | 4th |

○ : ENGAGED  × : RELEASED  ● : ON-ABNORMALITY

FIG. 8

| 3rd | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | ○ | | ○ | | | | |
| C2 ON ABNORMALITY | ○→× | ●→○ | ○ | | | C2-C3 | 7th |
| C4 ON ABNORMALITY | ○ | | ○ | ●→▲ | | C1-C3 | 3rd |
| B1 ON ABNORMALITY | ○ | | ○ | | ●→▲ | C1-C3 | 3rd |

○ : ENGAGED   × : RELEASED   ● : ON-ABNORMALITY   ▲ : NOT ENGAGED

FIG. 9

| 4th | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | ○ | | | ○ | | | |
| C2ON ABNORMALITY | ○→× | ●→○ | | ○ | | C2-C4 | 6th |
| C3ON ABNORMALITY | ○ | | ●→○→× | ○○→× | | C1-C3 | 3rd |
| B1ON ABNORMALITY | ○ | | | ○ | ●→▲ | C1-C4 | 4th |

○ : ENGAGED    × : RELEASED    ● : ON-ABNORMALITY    ▲ : NOT ENGAGED

FIG. 10

| 5th | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | ○ | ○ | | | | | |
| C3 ON ABNORMALITY | ○→× | ○ | ●→○ | | | C2-C3 | 7th |
| C4 ON ABNORMALITY | ○→× | ○ | | ●→○ | | C2-C4 | 6th |
| B1 ON ABNORMALITY | ○→× | ○ | | | ●→○ | C2-B1 | 8th |

○ : ENGAGED      × : RELEASED      ● : ON-ABNORMALITY

FIG. 11

| 6th | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | | ○ | | ○ | | | |
| C1ON ABNORMALITY | ●→▲ | ○ | | ○ | | C2−C4 | 6th |
| C3ON ABNORMALITY | | ○ | ●→○ | ○→× | | C2−C3 | 7th |
| B1ON ABNORMALITY | | ○ | | ○→× | ●→○ | C2−B1 | 8th |

○ : ENGAGED   × : RELEASED   ● : ON-ABNORMALITY   ▲ : NOT ENGAGED

FIG. 12

| 7th | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | | ○ | ○ | | | | |
| C1 ON ABNORMALITY | ●→▲ | ○ | ○ | | | C2-C3 | 7th |
| C4 ON ABNORMALITY | | ○ | ○ | ●→▲ | | C2-C3 | 7th |
| B1 ON ABNORMALITY | | ○ | ○ | | ●→▲ | C2-C3 | 7th |

○ : ENGAGED   ● : ON-ABNORMALITY   ▲ : NOT ENGAGED

FIG. 13

| 8th | 1ST GROUP | | 2ND GROUP | | | AFTER FAIL-SAFE | |
|---|---|---|---|---|---|---|---|
| | C1 | C2 | C3 | C4 | B1 | ENGAGEMENT COMBINATION | GEAR STAGE |
| NORMAL | | ○ | | | ○ | | |
| C1ON ABNORMALITY | ●→▲ | ○ | | | ○ | C2-B1 | 8th |
| C3ON ABNORMALITY | | ○ | ●→○ | | ○→× | C2-C3 | 7th |
| C4ON ABNORMALITY | | ○ | | ●→▲ | ○ | C2-B1 | 8th |

○ : ENGAGED  × : RELEASED  ● : ON-ABNORMALITY  ▲ : NOT ENGAGED

CONTROL APPARATUS OF VEHICULAR AUTOMATIC TRANSMISSION

INCORPORATION BY REFERENCE

The disclosure of Japanese Patent Applications No. 2005-212873 filed on Jul. 22, 2005, including the specification, drawings and abstract is incorporated herein by reference in its entirety.

BACKGROUND OF THE INVENTION

1. Field of the Invention

The present invention relates to a hydraulic control apparatus of a vehicular automatic transmission and, more particularly, to a fail-safe apparatus that avoids the occurrence of interlock of an automatic transmission.

2. Description of the Related Art

Vehicles provided with an automatic transmission that includes a plurality of friction engagement devices belonging to a first group, and a plurality of friction engagement devices belonging to a second group, and that establishes a plurality of speed change stages of different speed change ratios by simultaneous engagements of one of the friction engagement devices belonging to the first group and of one of the friction engagement device belonging to the second group, are well known. For example, Japanese Patent Application Publication No. JP-A-2000-249219 describes such a vehicle. Japanese Patent Application Publication No. JP-A-2000-249219 discloses a control apparatus constructed as follows. That is, at the time of a failure where two friction engagement devices of the second group simultaneously engage, the control apparatus stops the supply of oil pressure to the friction engagement devices other than the two friction engagement devices used for establishing the predetermined speed change stage through the use of a fail-safe valve, and thereby prevents the interlock of the automatic transmission.

It is conceivable that the shift from the speed change stage maintained immediately prior to the occurrence of a failure to the predetermined speed change stage established at the time of the occurrence of the failure is a downshift. On that occasion, an automatic transmission having multiple speed change stages with an increased number of friction engagement devices may sometimes undergo a downshift of two or more stages from the speed change stage maintained immediately prior to the occurrence of the failure, in which case there is a possibility of occurrence of an uncomfortable behavior of the vehicle.

For example, in an automatic transmission that establishes a plurality of speed change stages of different speed change ratios as indicated in an engagement operation table of FIG. 2, the interlock of the automatic transmission occurs due to simultaneous engagements of any two of friction engagement devices, that is, a clutch C3, a clutch C4, and a brake B1. Therefore, in this automatic transmission, it is conceivable to provide a fail-safe valve so as to prevent simultaneous engagements of those friction engagement devices. Let it assumed that the clutch C3, the clutch C4 and the brake B1 are given degrees of priority in the order of, for example, clutch C3, the clutch C4 and the brake B1, in order to engage one of them with priority to establish a speed change stage. Then, at the time of a failure where the oil pressure for engagement of the clutch C4 is output during running with the eighth speed change stage, the clutch C4 is engaged with priority over the brake B1, to establish the sixth speed change stage, thus bringing about a downshift of two or more stages, which is likely to lead to an uncomfortable behavior of the vehicle. On the assumption that degrees of engagement priority are given in the order of the clutch C3, the brake B1 and the clutch C4 in order to avoid the occurrence of a downshift of two or more stages during running with the eighth speed change stage, if during running with the fourth speed change stage, a failure occurs where the oil pressure for engagement of the brake B1 is output, the brake B1 is engaged with priority over the clutch C4, thus bringing about a downshift of two or more stages, which is likely to lead to an uncomfortable behavior of the vehicle.

SUMMARY OF THE INVENTION

In view of the aforementioned problems, an embodiment provided as an example of the invention is as follows. That is, in a vehicular automatic transmission that is caused to establish a plurality of speed change stages of different speed change ratios by selective engagement of a plurality of friction engagement devices, a hydraulic control apparatus that substantially prevents the occurrence of an uncomfortable behavior of the vehicle at the time of prevention of the occurrence of interlock of the automatic transmission via a fail-safe device is provided.

There is provided a hydraulic control apparatus of a vehicle automatic transmission (a) which has two friction engagement devices belonging to a first group and a plurality of friction engagement devices belonging to a second group, and which is caused to establish a plurality of speed change stages of different speed change ratios by either one of an event of simultaneous engagements of the two friction engagement devices belonging to the first group and an event of simultaneous engagements of one of the friction engagement devices belonging to the first group and one of the friction engagement devices belonging to the second group, and which is caused to establish one of low vehicle speed-side speed change stages having greater speed change ratios than a predetermined speed change stage by engaging one of the friction engagement devices belonging to the first group and selectively engaging one of the friction engagement devices belonging to the second group, or is caused to establish one of high vehicle speed-side speed change stages having smaller speed change ratios than the predetermined speed change stage by engaging another one of the friction engagement devices belonging to the first group and selectively engaging one of the friction engagement devices belonging to the second group, the hydraulic control apparatus comprising: (b) a fail-safe device to which oil pressures for engaging the friction engagement devices belonging to the second group are input, and which, if there occurs a failure where an oil pressure that causes simultaneous engagements of friction engagement devices belonging to the second group is output, stops supply of an oil pressure to a friction engagement device other than a priority-given friction engagement device belonging to the second group so that an oil pressure is output to the priority-given friction engagement device in accordance with predetermined degrees of priority, so as to establish one of the low vehicle speed-side speed change stages provided that a low vehicle speed-side speed change stage was established prior to the failure, and so as to establish one of the high vehicle speed-side speed change stages provided that a high vehicle speed-side speed change stage was established prior to the failure; and (c) a switching device that changes a manner of input of the oil pressures to the fail-safe device and thereby change the degrees of priority based on a state of engagement of at least one friction engagement device belonging to the first group.

In a vehicular automatic transmission in which a plurality of speed change stages of different speed change ratios are established by either one of an event of simultaneous engagements of two friction engagement devices belonging to the first group and an event of simultaneous engagements of one of the friction engagement devices belonging to the first group and one of the friction engagement devices belonging to the second group, the above-described hydraulic control apparatus of the vehicular automatic transmission operates as described below if there occurs a failure where an oil pressure that causes simultaneous engagements of friction engagement devices belonging to the second group is output. That is, on the basis of the state of engagement of at least one friction engagement device belonging to the first group, the switching device changes the manner in which oil pressures for engaging friction engagement devices belonging to the second group are input to the fail-safe device which stops the supply of an oil pressure to a friction engagement device other than a priority-given friction engagement device belonging to the second group so that an oil pressure is output to the priority-given friction engagement device in accordance with predetermined degrees of priority. Thus, the degrees of priority are changed. Specifically, the degree of priority for engaging a friction engagement device belonging to the second group is changed to a desired degree of priority that accords with the state of engagement of the at least one friction engagement device belonging to the first group, that is, to a desired degree of priority that accords with either one of the case where a low vehicle speed-side speed change stage has been established and the case where a high vehicle speed-side speed change stage has been established, so that the occurrence of an uncomfortable behavior of the vehicle due to the shift to the speed change stage established by the fail-safe device in order to prevent the occurrence of interlock of the automatic transmission will be substantially prevented.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 2 is an operation chart illustrating combinations of operations of hydraulic friction engagement devices for establishing a plurality of speed change stages in the vehicular automatic transmission shown in FIG. 1;

FIG. 7 is a chart illustrating fail-safe gear stages established by a switching operation of the hydraulic control circuit when a failure in a second group of engagement devices or an ON-failure of a clutch C2 occurs during the second speed change stage;

FIG. 8 is a chart illustrating fail-safe gear stages established by a switching operation of the hydraulic control circuit when a failure in the second group of engagement devices or an ON-failure of the clutch C2 occurs during the third speed change stage;

FIG. 9 is a chart illustrating fail-safe gear stages established by a switching operation of the hydraulic control circuit when a failure in the second group of engagement devices or an ON-failure of the clutch C2 occurs during the fourth speed change stage;

FIG. 10 is a chart illustrating fail-safe gear stages established by a switching operation of the hydraulic control circuit when a failure in the second group of engagement devices occurs during the fifth speed change stage;

FIG. 11 is a chart illustrating fail-safe gear stages established by a switching operation of the hydraulic control circuit when a failure in the second group of engagement devices or an ON-failure of a clutch C1 occurs during the sixth speed change stage;

FIG. 12 is a chart illustrating fail-safe gear stages established by a switching operation of the hydraulic control circuit when a failure in the second group of engagement devices or an ON-failure of the clutch C1 occurs during the seventh speed change stage; and FIG. 13 is a chart illustrating fail-safe gear stages established by a switching operation of the hydraulic control circuit when a failure in the second group of engagement devices or an ON-failure of a clutch C1 occurs during the eighth speed change stage.

DETAILED DESCRIPTION OF THE PREFERRED EMBODIMENTS

In the following description and the accompanying drawings, the present invention will be described in more detail with reference to exemplary embodiments.

Figure 1:
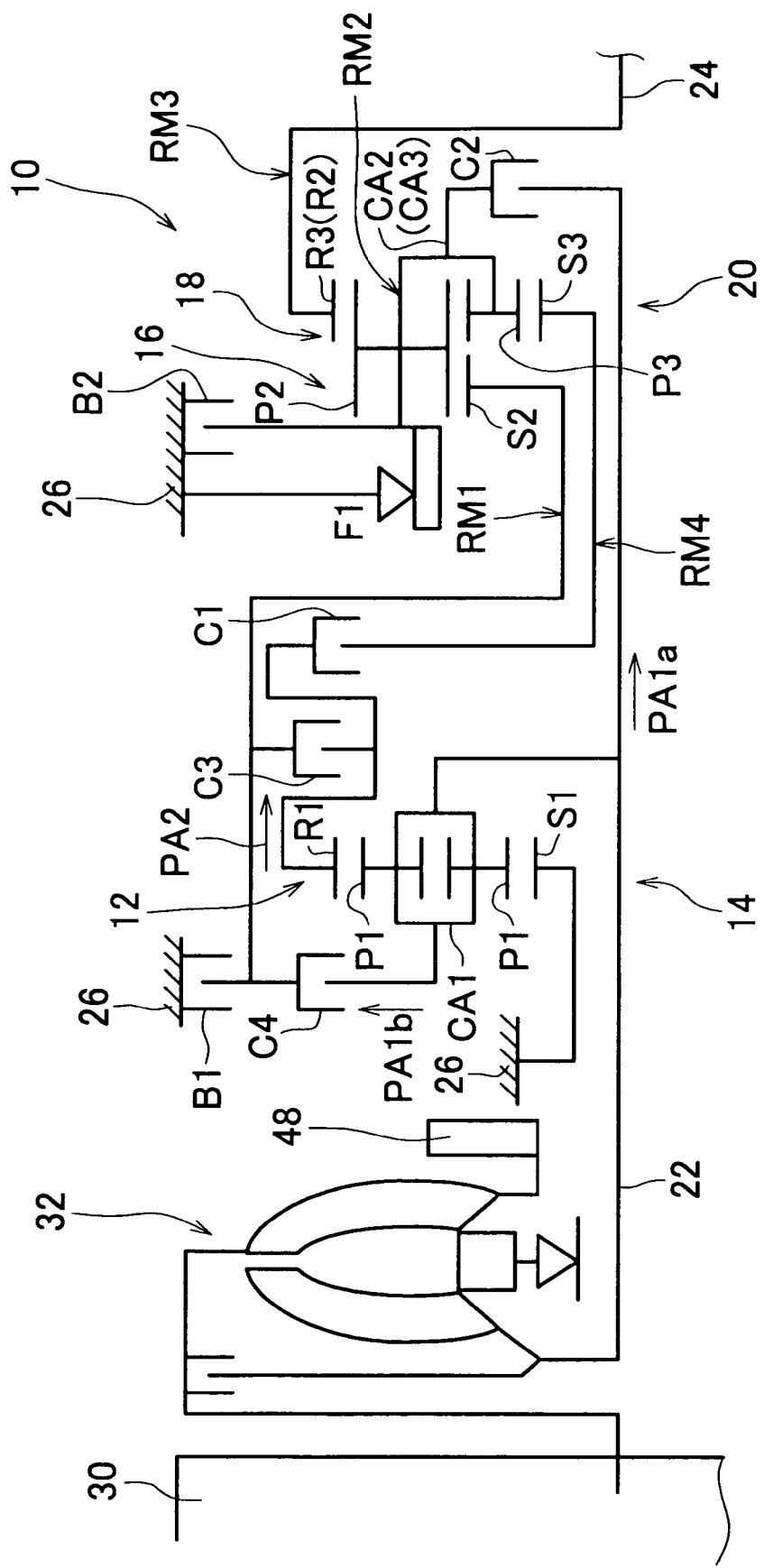
FIG. 1 is a skeleton diagram illustrating a construction of a vehicular automatic transmission to which the present invention is applied.

FIG. 1 is a skeleton diagram illustrating a construction of a vehicular automatic transmission (hereinafter, referred to as "automatic transmission") 10 to which the present invention is applied. FIG. 2 is an operation chart (engagement operation table) illustrating combinations of operations of engagement devices (engagement elements) for establishing a plurality of speed change stages in the automatic transmission 10 shown. The automatic transmission 10 has, in a transmission case (hereinafter, referred to as "case") 26 provided as a non-rotating member attached to a vehicle body, a first speed changer portion 14 made up mainly of a double pinion-type first planetary gear set 12, and a second speed changer portion 20 made up mainly of a single pinion-type second planetary gear set 16 and a double pinion-type third planetary gear set 18, on a common axis. The automatic transmission 10 changes the rotation of an input shaft 22 in speed, and outputs it from an output shaft 24. The input shaft 22 corresponds to an input rotating member and, in this embodiment, is a turbine shaft of a torque converter 32 that is rotationally driven by an engine 30 that is a power source for running the vehicle. The output shaft 24 corresponds to an output rotating member, and rotationally drives, for example, left and right-side driving wheels sequentially via a differential gear set (final speed reducer), a pair of axles, etc. (not shown in the drawings). Incidentally, the automatic transmission 10 is constructed substantially symmetrically about the axis thereof, and the illustration of a half portion thereof below the axis is omitted in the skeleton diagram of FIG. 1.

The first planetary gear set 12 includes a sun gear S1, a plural pairs of pinion gears P1 meshed with each other, a carrier CA1 supporting the pinion gears P1 rotatably and revolvably, and a ring gear R1 meshed with the sun gear S1 via the pinion gears P1. The sun gear S1, the carrier CA1 and the ring gear R1 form three rotating element. The carrier CA1 is coupled to the input shaft 22, and is rotationally driven, and the sun gear S1 is fixed integrally with the case 26 so as to be unrotatable. The ring gear R1 functions as an intermediate output member, and is rotated at reduced speed relative to the input shaft 22, and transfers rotation to a second speed changer portion 20. In this embodiment, a path of transferring the rotation of the input shaft 22 to the second speed changer portion 20 without changing the rotation speed is a first intermediate output path PA1 of transferring rotation at a predetermined constant speed change ratio (=1.0). The first intermediate output path PA1 includes a first path PA1a of transferring rotation from the input shaft 22 to the second speed changer portion 20 without transfer through the first planetary gear set 12, and a second path PA1b of transferring rotation from the input shaft 20 to the second speed changer portion 20 via the carrier CA1 of the first planetary gear set 12. Another path of transferring rotation from the input shaft 22 to the second speed changer portion 20 via the carrier CA1, the pinion gears P1 disposed on the carrier CA1, and the ring gear R1 is a second intermediate output path PA2 of transferring rotation of the input shaft 22 while changing the speed (reducing the speed) of rotation at a speed change ratio (>1.0) that is greater than that of the first intermediate output path PA1.

The second planetary gear set 16 includes a sun gear S2, pinion gears P2, a carrier CA2 supporting the pinion gears P2 rotatably and revolvably, and a ring gear R2 meshed with the sun gear S2 via the pinion gears P2. The third planetary gear set 18 includes a sun gear S3, a plurality of pairs of pinion gears P2 and P3 meshed with each other, a carrier CA3 supporting the pinion gears P2 and P3 rotatably and revolvably, and a ring gear R3 meshed with the sun gear S3 via the pinion gears P2 and P3.

In the second planetary gear set 16 and the third planetary gear set 18, the aforementioned components form four rotating elements RM1 to RM4 since some of the components are coupled to each other. Specifically, the sun gear S2 of the second planetary gear set 16 forms a first rotating element RM1, and the carrier CA2 of the second planetary gear set 16 and the carrier CA3 of the third planetary gear set 18 are integrally coupled to form a second rotating element RM2. Furthermore, the ring gear R2 of the second planetary gear set 16 and the ring gear R3 of the third planetary gear set 18 are integrally coupled to form a third rotating element RM3, and the sun gear S3 of the third planetary gear set 18 forms a fourth rotating element RM4. Thus, the second planetary gear set 16 and the third planetary gear set 18 are provided as a Ravigneaux type planetary gear train in which the carriers CA2 and CA3 are formed by a common member, and the ring gears R2 and R3 are formed by a common member, and the pinion gears P2 of the second planetary gear set 16 serve also as the second pinion gears of the third planetary gear set 18.

The first rotating element RM1 (sun gear S2) is selectively coupled to the case 26 and therefore is stopped from rotating via a first brake B1, and is also selectively coupled to the ring gear R1 of the first planetary gear set 18 which is an intermediate output member (i.e., a second intermediate output path PA2) via a third clutch C3. Furthermore, the first rotating element RM1 is selectively coupled to the carrier CA1 of the first planetary gear set 12 (i.e., the second path PA1b of the first intermediate output path PA1) via a fourth clutch C4. The second rotating element RM2 (the carrier CA2 and CA3) is selectively coupled to the case 26 and therefore is stopped from rotating via a second brake B2, and is also selectively coupled to the input shaft 22 (i.e., the first path PA1a of the first intermediate output path PA1) via a second clutch C2.

The third rotating element RM3 (the ring gear R2 and R3) is coupled integrally to the output shaft 24 to output rotation. The fourth rotating element RM4 (the sun gear S3) is coupled to the ring gear R1 via a first clutch C1. A one-way clutch F1 for stopping reverse rotation of the second rotating element RM2 while allowing forward rotation thereof (the same rotational direction as that of the input shaft 22) is provided in parallel with the second brake B2, between the second rotating element RM2 and the case 26.

Referring back to FIG. 2, this engagement operation table illustrates the states of operation of the clutches C1 to C4 and the brakes B1, B2 for establishing speed change stages of the automatic transmission 10, in which "○" indicates an engaged state, and "(○)" indicates an engaged state only during the engine brake, and each blank indicates a released state. As shown in FIG. 2, the automatic transmission 10 achieves the multi-stage shifting of eight forward speed stages through the use of three planetary gear sets 12, 16, 18, the clutches C1 to C4 and the brakes B1, B2. The speed change ratios of the speed change stages are suitably determined by the gear ratios ρ1, ρ2, ρ3 of the first planetary gear set 12, the second planetary gear set 16 and the third planetary gear set 18. The clutches C1 to C4 and the brakes B1, B2 (hereinafter, referred to simply as "clutches C" and "brakes B") are hydraulic friction engagement devices (hereinafter, referred to as "engagement devices") that are engaged and controlled by hydraulic actuators, for example, multi-disc clutches or brakes.

As shown in FIG. 2, the eight forward speed change stages can be divided, with reference to a predetermined speed change stage, for example, the fifth speed change stage (5th) established by engaging the clutch C1 and the clutch C2, into low vehicle speed-side speed change stages (1st, 2nd, 3rd, 4th) having greater speed change ratios than the predetermined speed change stage, and high vehicle speed-side speed change stages (6th, 7th, 8th) having smaller speed change ratios than the predetermined speed change stage. The low vehicle speed-side speed change stages are established by the engagement of the clutch C1 and the engagement of one of the clutches C3, C4 and the brake B1. The high vehicle speed-side speed change stages are established by the engagement of the clutch C2 and the engagement of one of the clutches C3, C4 and the brake B1. Incidentally, since the one-way clutch F1 is provided in parallel with the brake B2, the first speed change stage (1st) is established only by the engagement of the clutch C1 at the time of takeoff (acceleration).

That is, assuming that the clutch C1 and the clutch C2 are two engagement devices belonging to a first group, and that the clutches C3, C4 and the brake B1 are engagement devices belonging to a second group, the automatic transmission 10 is caused to establish a plurality of speed change stages of different speed change ratios by either one of an event of simultaneous engagements of the two engagement devices (C1 and C2) belonging to the first group and an event of simultaneous engagements of one of the engagement devices (C1 or C2) belonging to the first group and one of the engagement devices (C3, C4 or B1) belonging to the second group. Furthermore, the automatic transmission 10 is caused to establish one of the low vehicle speed-side speed change stages (2nd, 3rd, 4th) having greater speed change ratios than the predetermined speed change stage (5th) by engaging one of the engagement devices (C1) belonging to the first group and selectively engaging one of the engagement devices (C3, C4 or B1) belonging to the second group, and is caused to establish one of the high vehicle speed-side speed change stages (6th, 7th, 8th) having smaller speed change ratios than the predetermined speed change stage (5th) by selecting the other one of the friction engagement devices (C2) belonging to the first group and engaging one of the friction engagement devices (C3, C4 or B1) belonging to the second group.

The shifting between the speed change stages can be performed merely by engaging two of the clutches C1 to C4 and the brakes B1, B2. The engagement of an engagement device other than the engagements of the two engagement devices for establishing (achieving) any one of the speed change stages is an abnormal engagement, whereby interlock of the automatic transmission 10 is caused. For example, at the time of a failure where two of the engagement devices belonging to the second group are simultaneously engaged, this abnormal engagement causes interlock of the automatic transmission 10.

Figure 3:
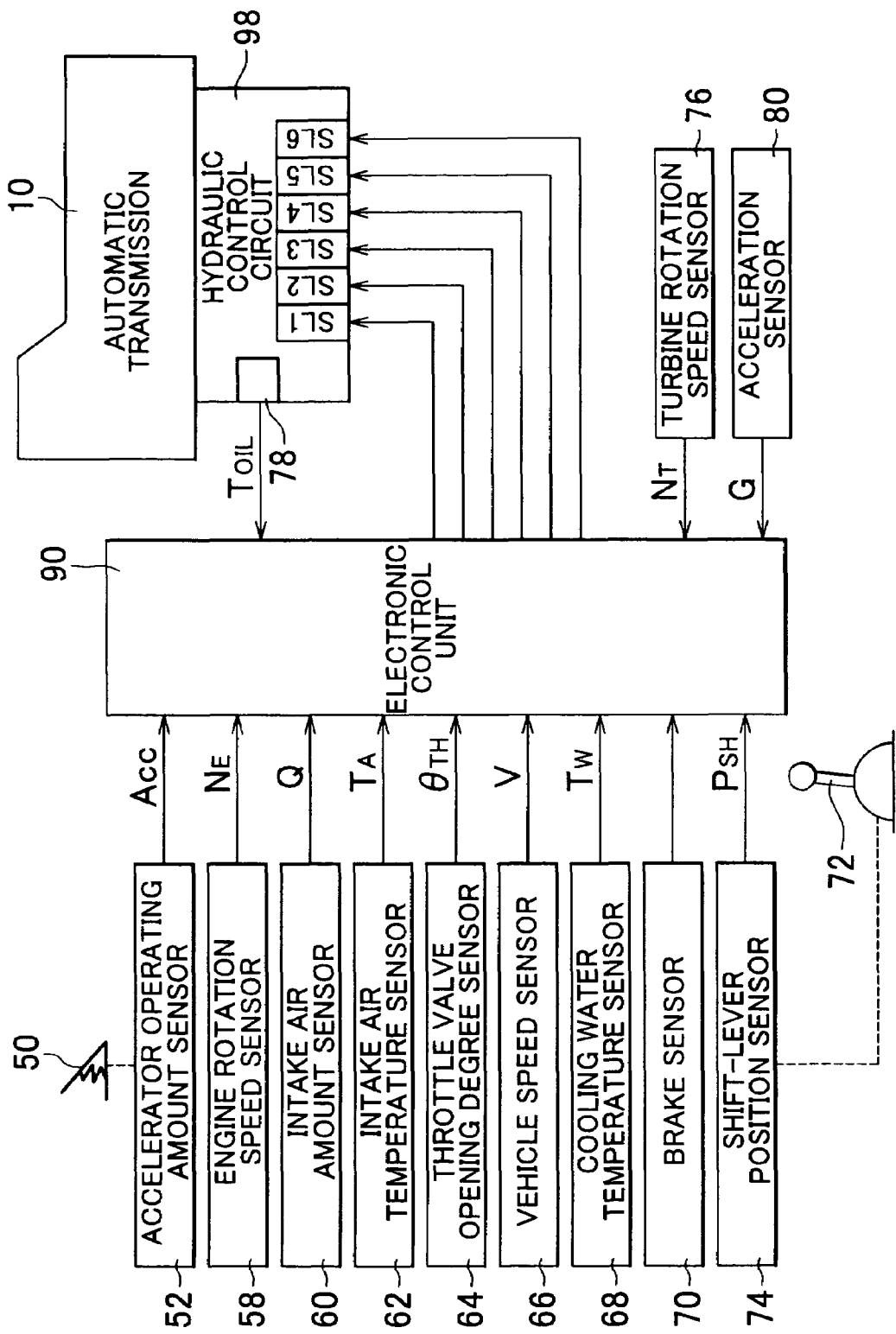
FIG. 3 is a block diagram illustrating portions of a control system provided in the vehicle for controlling the automatic transmission of FIG. 1.

FIG. 3 is a block diagram illustrating portions of a control system provided in the vehicle for controlling the automatic transmission 10 of FIG. 1, and the like. An electronic control unit 90 includes a so-called microcomputer that has a CPU, a RAM, ROM, an input/output interface, etc. The CPU executes an output control of an engine 30, a shift control of the automatic transmission 10, etc., by performing signal processing in accordance with programs pre-stored in the ROM through the use of the temporary storage function of the RAM. The electronic control unit 90 may be separated for the engine control, the shift control, etc., in accordance with need.

In FIG. 3, the amount of operation Acc of an accelerator pedal 50 is detected by an accelerator operation amount sensor 52, and a signal indicating the accelerator operation amount Acc is supplied to the electronic control unit 90. The accelerator pedal 50, which is depressed corresponding to the driver's requested output amount, corresponds to an accelerator operating member, and the accelerator operation amount Acc corresponds to the requested output amount.

Furthermore provided are an engine rotation speed sensor 58 for detecting the rotation speed NE of the engine 30, an intake air amount sensor 60 for detecting the intake air amount Q of the engine 30, an intake air temperature sensor 62 for detecting the temperature TA of intake air, a throttle valve opening degree sensor 64 for detecting the degree of opening θTH of an electronic throttle valve, a vehicle speed sensor 66 for detecting the vehicle speed V (corresponding to the rotation speed NOUT of the output shaft 24), a cooling water temperature sensor 68 for detecting the cooling water temperature TW of the engine 30, a brake switch 70 for detecting the presence/absence of operation of a foot brake that is a service brake, a shift-lever position sensor 74 for detecting the lever position (operation position) PSH of a shift lever 72, a turbine rotation speed sensor 76 for detecting the turbine rotation speed NT (=the rotation speed NIN of the input shaft 22), an AT oil temperature sensor 78 for detecting the AT oil temperature TOIL that is the temperature of working oil within a hydraulic control circuit 98, an acceleration sensor 80 for detecting the acceleration (deceleration) G of the vehicle, etc. These sensors and switches and the like supply signals indicating the engine rotation speed NE, the intake air amount Q, the intake air temperature TA, the throttle valve opening degree θTH, the vehicle speed V, the output shaft rotation speed NOUT, the engine cooling water temperature TW, the presence/absence of brake operation, the lever position PSH of the shift lever 72, the turbine rotation speed NT, the AT oil temperature TOIL, the acceleration (deceleration) G of the vehicle, etc., to the electronic control unit 90.

Figure 4:
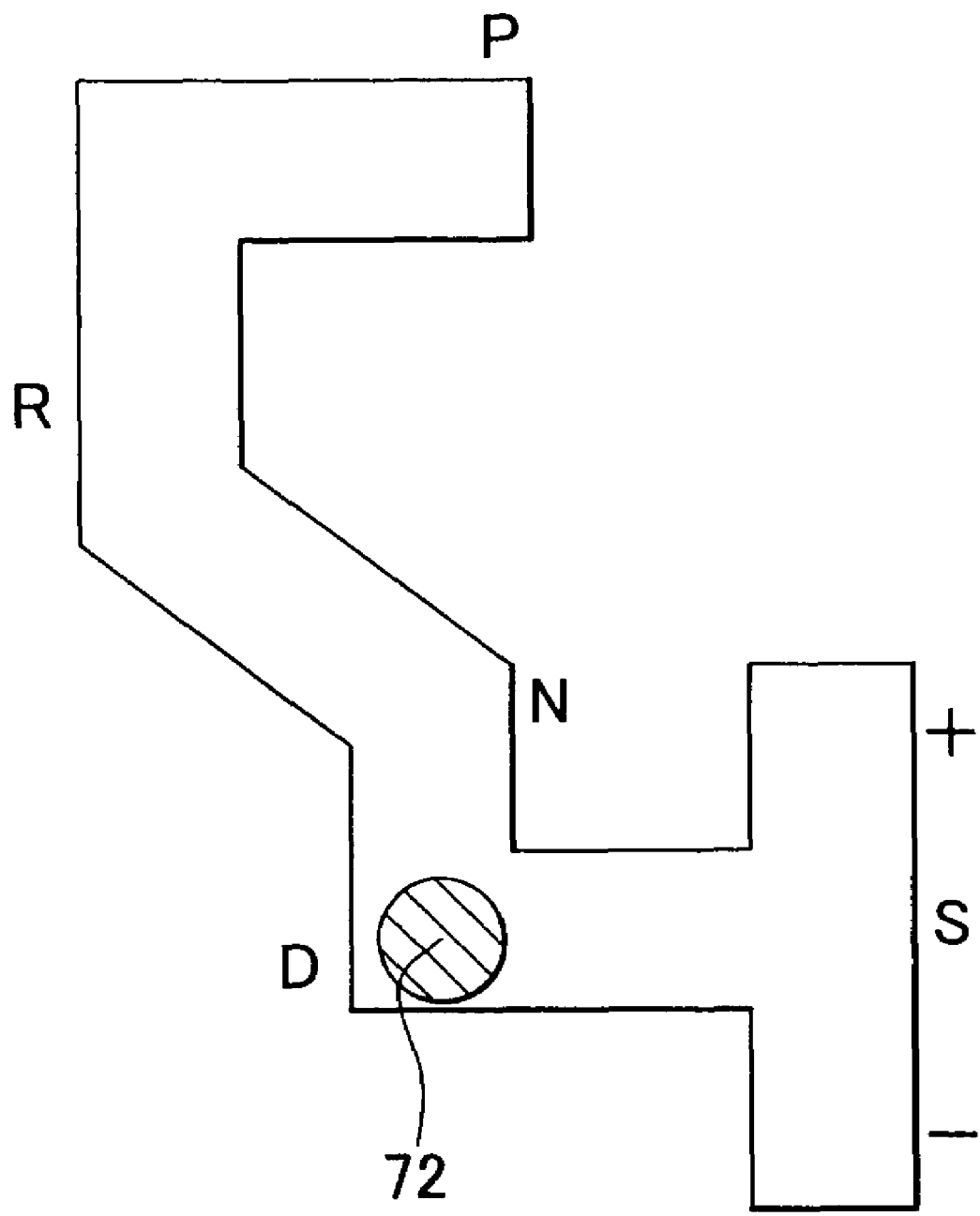
FIG. 4 is a diagram illustrating operation positions of a shift lever shown in FIG. 3.

The shift lever 72 is disposed, for example, near the driver's seat, and is manually operated to one of five lever positions "P", "R", "N", "D" or "S" as shown in FIG. 4. The "P" position is a parking position that opens the power transfer path in the automatic transmission 10 and mechanically stopping (locking) rotation of the output shaft 24 via a mechanical parking mechanism. The "R" position is a reverse run position that sets the rotational direction of the output shaft 24 of the automatic transmission 10 to the reverse rotation direction. The "N" position is a power transfer cutoff position that opens the power transfer path in the automatic transmission 10, that is, bringing about a neutral state where the power transfer in the automatic transmission 10 is cut off. The "D" position is a forward run position for execution of an automatic shift control in a shift range (D range) that allows shift between speed change stages of the first speed to the eighth speed. The "S" position is a forward run position that allows manual shift by changing among a plurality of shift ranges or a plurality of speed change stages that are different in terms of the high speed-side speed change stages that are shiftable. The "S" position is provided with a "+" position for upshifting the shift range or speed change stage every time the shift lever 72 is operated to the position, and a "−" position for downshifting the shift range or speed change stage every time the shift lever 72 is operated to the position. The shift-lever position sensor 74 detects at which one of the lever positions (operation positions) PSH the shift lever 72 is positioned.

The hydraulic control circuit 98 is provided with, for example, a manual valve that is connected to the shift lever 72 via a cable, a link, etc. As the shift lever 72 is operated, the manual valve is mechanically operated so as to change hydraulic circuits in the hydraulic control circuit 98. For example, when the shift lever 72 is at the "D" position of the "S" position, a forward oil pressure PD is output to mechanically establish a forward run circuit, thus making it possible to run the vehicle forward while shifting among the first speed change stage "1st" to the eighth speed change stage "8th", which are forward speed change stages. When the shift lever 72 is operated to the "D" position, the electronic control unit 90 determines such an operation of the shift lever 72 from the signal from the shift-lever position sensor 74, and establishes an automatic shift mode, in which shift control is performed using all the forward speed change stages, that is, the first speed change stage "1st" to the eighth speed change stage "8th".

Figure 5:
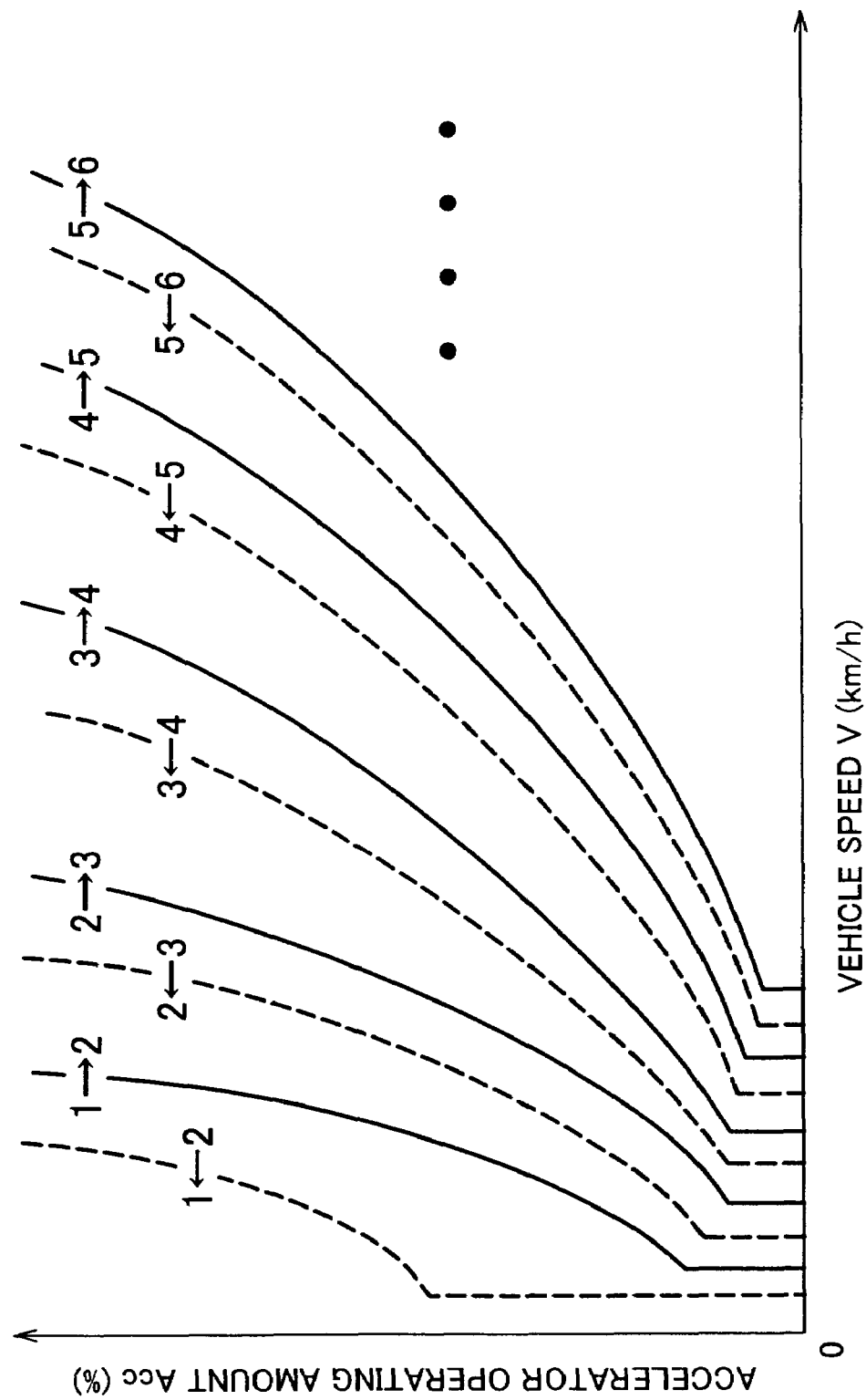
FIG. 5 is a diagram exemplifying a shift chart used in a shift control of an electronic control unit shown in FIG. 3.

The electronic control unit 90 is functionally provided with a shift control means for making a determination regarding the shift on the basis of the actual vehicle speed V and the actual accelerator operation amount Acc from a pre-stored relationship (a map, a shift) in which the vehicle speed V and the accelerator operation amount Acc are used as parameters as shown in FIG. 5, and carrying out shift control of automatically switching speed change stages of the automatic transmission 10 so as to attain the determined speed change stage. For example, lower speed-side speed change stages with greater speed change ratios are established as the vehicle speed V decreases or as the accelerator operation amount Acc increases. In this shift control, the excitation and deexcitation and the electric current control of the linear solenoid valves SL1 to SL6 in the shift-purpose hydraulic control circuit 98 are executed to change the engaged and released states of the clutches C and the brakes B and to control the transitional oil pressure during the shift process, and the like, for example, in accordance with the engagement operation table of FIG. 2 so that the speed change stage determined as described is established. That is, by controlling the excitation and deexcitation of each linear solenoid valve SL1 to SL6, the engaged and released states of the clutches C1 to C4 and the brakes B1, B2 corresponding to the linear solenoid valves SL1 to SL6 are changed so as to establish one of the first speed change stage "1st" to the eighth speed change stage "8th".

In the shift chart of FIG. 5, each solid line is a shift line for determining an upshift (an upshift line), and each broken line is a shift line for determining a downshift (a downshift line). The shift lines in the shift chart of FIG. 5 are for determining whether or not the actual vehicle speed V has crossed a horizontal line that indicates the actual accelerator operation amount Acc (%), that is, whether or not the value (shift point vehicle speed) VS on the shift line at which the shift should be executed has been exceeded. That is, each shift line is pre-stored as a series of such values VS, that is, a train of such shift point vehicle speeds. Incidentally, the shift chart of FIG. 5 exemplifies the shift lines of the first speed change stage to the sixth speed change stage of the first to eight speed change stages for which shift is performed by the automatic transmission 10.

Figure 6:
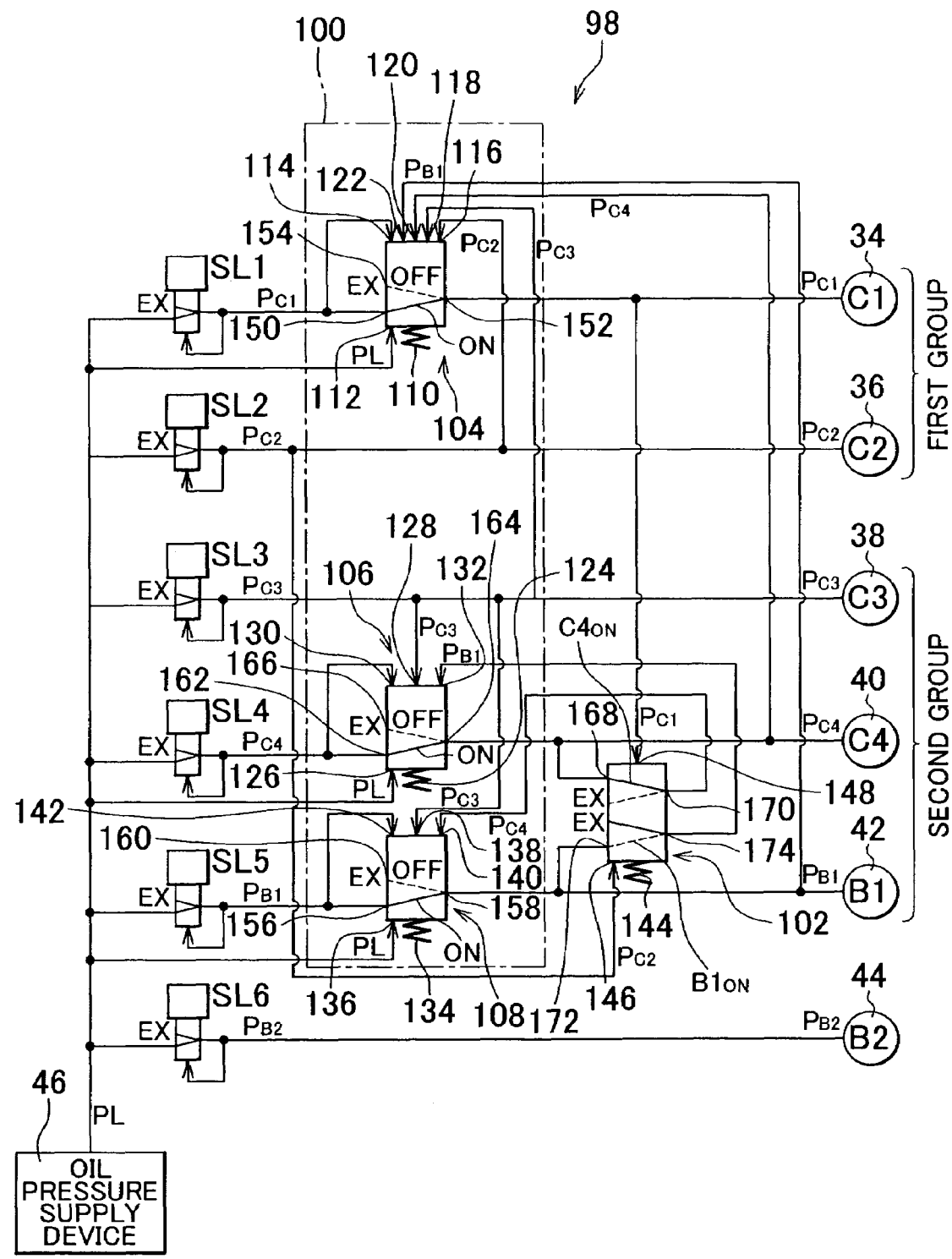
FIG. 6 is a circuit diagram showing portions of a hydraulic control circuit shown in FIG. 3, that is, linear solenoid valves, a fail-safe valve group, and a switching valve.

For example, upon determining that the actual vehicle speed V has crossed a 7th→8th upshift line provided for execution of the 7th→8th upshift, that is, upon determining that a shift point vehicle speed V7-8 has been exceeded, the electronic control unit 90 outputs to the hydraulic control circuit 98 a command to release the clutch C3 and engage the brake B1, that is, a command to drain the engagement oil pressure of the clutch C3 through deexcitation is output to the linear solenoid valve SL3 and a command to supply the engagement oil pressure to the brake B1 through excitation is output to the linear solenoid valve SL5 (see FIG. 6).

Thus, in the automatic transmission 10, each speed change stage is established by engaging predetermined engagement devices (the clutches C, the brakes B), for example, as shown in the engagement operation table of FIG. 2. However, there is a possibility of occurrence of interlock of the automatic transmission 10 due to an abnormal engagement where at the time of establishing a speed change stage, an engagement device other than the predetermined engagement devices for the speed change stage is simultaneously engaged. The abnormal engagement of an engagement device that is to be assumed is, for example, an ON-failure (on-abnormality) in which an engagement device that is not to be involved in the establishment of a speed change stage is supplied with working oil from the corresponding linear solenoid valve so that the engagement device is abnormally engaged, due to, for example, a failure of the linear solenoid valve, a failure of the control system of the linear solenoid valve, etc. In this embodiment, if interlock of the automatic transmission 10 occurs due to the abnormal engagement of an engagement device, the occurrence of interlock is appropriately avoided (prevented). Hereinafter, the hydraulic control circuit 98 as a hydraulic control apparatus for preventing occurrence of interlock will be concretely described.

FIG. 6 is a circuit diagram illustrating portions of the hydraulic control circuit 98 that are related to the linear solenoid valves SL1 to SL6, a fail-safe valve group 100 as a fail-safe device for preventing the occurrence of interlock of the automatic transmission 10 caused by the ON-failure of an engagement device and for establishing a predetermined speed change stage, that is, a fail-safe gear stage in accordance with a predetermined degree of priority, a priority degree switching valve 102 as a switch device for changing the manner of input of oil pressure to the fail-safe valve group 100 and thereby changing the degree of priority thereof, etc.

In FIG. 6, an oil pressure supply device 46 has a mechanical oil pump 48 (see FIG. 1) that is rotationally driven by the engine 30, a regulator valve for adjusting the line oil pressure PL, etc., and controls the line oil pressure PL to be supplied to the linear solenoid valves SL1 to SL6, the fail-safe valve group 100, etc., in accordance with the engine load, and the like.

The linear solenoid valves SL1 to SL6 basically have the same construction, and each of the valves is independently excited and deexcited by the electronic control unit 90 (see FIG. 3) to regulate and control the oil pressure supplied to a corresponding one of hydraulic actuators (hydraulic cylinders) 34, 36, 38, 40, 42, 44. That is, the hydraulic actuators 34, 36, 38, 40, 42, 44 of the clutches C1 to C4 and the brakes B1, B2 are supplied with the line oil pressure PL that is output by the oil pressure supply device 46 and is regulated by the linear solenoid valves SL1 to SL6. In FIG. 6, PC1, PC2, PC3, PC4, PB1 and PB2 each represent the oil pressure (control pressure) output by the linear solenoid valves SL1 to SL6 and supplied to the hydraulic actuators 34, 36, 38, 40, 42, 44 of the clutches C1 to C4 and the brakes B1, B2. Thus, the engagement devices (the clutches C, the brakes B) of the automatic transmission 10 are directly and independently controlled by their respective linear solenoid valves SL1 to SL6, so that the responsiveness of operation of the engagement devices improves. Furthermore, the hydraulic circuit for the engaging/releasing operations of the engagement devices can be simplified.

In this embodiment, the aforementioned "directly" covers the case where oil pressure is supplied via the fail-safe valve group 100 as long as the output oil pressure of the linear solenoid valves SL1 to SL6 is supplied to the hydraulic actuators of the clutches C and the brakes B without changing the oil pressure.

The fail-safe valve group 100 includes a low speed stage/high speed stage switching valve 104, a first priority engagement valve 106, and a second priority engagement valve 108.

The low speed stage/high speed stage switching valve 104 has a spring 110 that is provided on a first axial end side of a spool valve element B104 (not shown) provided in the low speed stage/high speed stage switching valve 104 and that gives a thrust force F110 to the spool valve element B104 in the direction to a position at an ON (solid line) side that allows the supply of the oil pressure PC1 to the clutch C1, an oil chamber 112 that is provided near the first axial end side of the spool valve element B104 and that receives the line oil pressure PL for urging the spool valve element B104 to the ON-side position, and oil chambers 114, 116, 118, 120, 122 that are provided near the second axial end side of the spool valve element B104 and that receive the oil pressures PC1, PC2, PC3, PC4, PB1 for urging the spool valve element B104 to an OFF (broken line) side position that allows the discharge of the working oil from the clutch C1. The thrust force F110 of the spring 110 is pre-set so that the spool valve element B104 is urged toward the OFF-side position if any two or more of the oil pressures PC2, PC3, PC4 and PB1 are input while the oil pressure PC1 is being input.

The first priority engagement valve 106 has a spring 124 that is provided on a first axial end side of a spool valve element B106 (not shown) provided in the first priority engagement valve 106 and that gives a thrust force F124 to the spool valve element B106 in the direction to a position at an ON (solid line) side that allows the supply of the oil pressure PC4 to the clutch C4, an oil chamber 126 that is provided near the first axial end side of the spool valve element B106 and that receives the line oil pressure PL for urging the spool valve element B106 to the ON-side position, and oil chambers 128, 130, 132 that are provided near the second axial end side of the spool valve element B106 and that receive the oil pressures PC3, PC4, PB1 for urging the spool valve element B106 to an OFF (broken line) side position that allows the discharge of the working oil from the clutch C4. The thrust force F124 of the spring 124 is pre-set so that the spool valve element B106 is urged toward the OFF-side position if either one of the oil pressures PC3 and PB1 is input while the oil pressure PC4 is being input. That is, at the time of a failure where in addition to the output from the oil pressure PC4 of the linear solenoid valve SL4, the oil pressure PC3 or the oil pressure PB1 is output from the linear solenoid valve SL3 or the linear solenoid valve SL5 bringing about an abnormal event of simultaneous engagements, the supply of the oil pressure PC3 to the clutch C3 or the supply of the oil pressure PB1 to the brake B1 is given priority, and the supply of the oil pressure PC4 to the clutch C4 is stopped.

The second priority engagement valve 108 has a spring 134 that is provided on a first axial end side of a spool valve element B108 (not shown) provided in the second priority engagement valve 108 and that gives a thrust force F134 to the spool valve element B108 in the direction to a position at an ON (solid line) side that allows the supply of the oil pressure PB1 to the brake B1, an oil chamber 136 that is provided near the first axial end side of the spool valve element B108 and that receives the line oil pressure PL for urging the spool valve element B108 to the ON-side position, and oil chambers 138, 140, 142 that are provided near the second axial end side of the spool valve element B108 and that receive the oil pressures PC3, PC4, PB1 for urging the spool valve element B108 to an OFF (broken line) side position that allows the discharge of the working oil from the brake B1. The thrust force F134 of the spring 134 is pre-set so that the spool valve element B108 is urged toward the OFF-side position if either one of the oil pressures PC3 and PC4 is input while the oil pressure PB1 is being input. That is, at the time of a failure where in addition to the output of the oil pressure PB1 from the linear solenoid valve SL5, the oil pressure PC3 or the oil pressure PC4 is output from the linear solenoid valve SL3 or the linear solenoid valve SL4 bringing about an abnormal event of simultaneous engagements, the supply of the oil pressure PC3 to the clutch C3 or the supply of the oil pressure PC4 to the clutch C4 is given priority, and the supply of the oil pressure PB1 to the brake B1 is stopped.

The thus-constructed fail-safe valve group 100 functions as follows. That is, at the time of a failure where two engagement devices of the engagement devices (C3, C4, B1) belonging to the second group are simultaneously engaged (hereinafter, referred to as "failure in the second group"), the oil pressure is output to one of the engagement devices (C3, C4 or B1) belonging to the second group in accordance with a predetermined degree of priority by the first priority engagement valve 106 and the second priority engagement valve 108. As a result, the low speed stage/high speed stage switching valve 104 is not switched to the OFF (broken line) side position, unless the oil pressure PC2 is input. Therefore, at the time of a failure in the second group of engagement devices, the fail-safe valve group 100 establishes one of the low vehicle speed-side speed change stages if before the failure, the oil pressure PC2 is not supplied and therefore a low vehicle speed-side speed change stage is established, or the fail-safe valve group 100 establishes one of the high vehicle speed-side speed change stages if before the failure, the oil pressure PC2 is supplied and therefore a high vehicle speed-side speed change stage is established.

Thus, at the time of a failure in the second group of engagement devices, the fail-safe valve group 100 is operated as follows: the supply of oil pressure to the engagement devices belonging to the second group other than the priority-given engagement device is stopped so that the priority-given engagement device is supplied with oil pressure in accordance with predetermined degrees of priority, thereby preventing the occurrence of interlock of the automatic transmission 10 caused by the ON-failure of an engagement device. Furthermore, if prior to a failure in the second group, a low vehicle speed-side speed change stage is established, one of the low vehicle speed-side speed change stages is established. If prior to a failure in the second group, a high vehicle speed-side speed change stage is established, one of the high vehicle speed-side speed change stages is established as a fail-safe gear stage.

As for the automatic transmission 10 of this embodiment, the speed change stages can be divided into the low vehicle speed-side speed change stages and the high vehicle speed-side speed change stages. Therefore, at the time of a failure in the second group, a downshift of two or more stages to a fail-safe gear can be prevented irrespective of the speed change stage on either the low vehicle speed side or the high vehicle speed side, provided that the supply of the oil pressure PC3 to the clutch C3 is given the highest priority.

Since in the fail-safe valve group 100, the supply of the oil pressure PC3 to the clutch C3 is given priority either by the first priority engagement valve 106 or by the second priority engagement valve 108, a hydraulic circuit is constructed such that the supply of the oil pressure PC3 to the clutch C3 is given highest priority at the time of a failure in the second group.

However, in the case of a failure in the second group where the oil pressure PC4 and the oil pressure PB1 are output, a downshift of two or more stages from the eighth speed change stage to the sixth speed change stage occurs if the supply of the oil pressure PC4 to the clutch C4 is given priority. Conversely, if the supply of the oil pressure PB1 to the brake B1 is given priority, a downshift of two or more stages from the fourth speed change stage to the second speed change stage occurs. That is, if in the fail-safe valve group 100, the supply of the oil pressure PB1 to the brake B1 is altogether given priority via the first priority engagement valve 106 over the supply of the oil pressure PC4 to the clutch C4, there is a possibility of occurrence of a downshift of two or more stages from the fourth speed change stage to the second speed change stage. If the supply of the oil pressure PC4 to the clutch C4 given priority via the second priority engagement valve 108 over the supply of the oil pressure PB1 to the brake B1, there is a possibility of occurrence of a downshift of two or more stages from the eighth speed change stage to the sixth speed change stage.

Therefore, if a low vehicle speed-side speed change stage has been selected at the time of a failure in the second group, a state in which the oil pressure PC4 can be input to the second priority engagement valve 108 and the oil pressure PB1 will not input to the first priority engagement valve 106 is set so that the supply of the oil pressure PC4 to the clutch C4 is given priority by the second priority engagement valve 108. If a high vehicle speed-side speed change stage has been selected at the time of a failure in the second group, a state in which the oil pressure PB1 can be input to the first priority engagement valve 106 and that the oil pressure PC4 will not be supplied to the second priority engagement valve 108 is set so that the supply of the oil pressure PB1 to the brake B1 is given priority by the first priority engagement valve 106. That is, the priority degree switching valve 102 is provided for the purpose of switching the degrees of priority of the supply of the oil pressure PC4 to the clutch C4 and the supply of the oil pressure PB1 to the brake B1 on the basis of whether the speed change stage of the automatic transmission 10 is on the low vehicle speed side or the high vehicle speed side.

The priority degree switching valve 102 has a spring 144 that is provided on a first axial end side of a spool valve element B102 (not shown) provided in the priority degree switching valve 102 and that gives a thrust force F144 to the spool valve element B102 in the direction to a position at a B1ON (broken line) side that allows the input of the oil pressure PB1 to the first priority engagement valve 106, an oil chamber 146 that is provided near the first axial end side of the spool valve element B102 and that receives the oil pressure PC2 for urging the spool valve element B102 to the B1ON-side position, and an oil chamber 148 that is provided near the second axial end side of the spool valve element B102 and that receives the oil pressures PC1 for urging the spool valve element B102 to an OFF (solid line) side position that allows the input of the working oil from the brake B1. The thrust force F144 of the spring 144 is pre-set so that the spool valve element B102 is urged toward the C4ON-side position if the oil pressure PC1 alone is input, in other words, so that the spool valve element B102 is urged toward the B1ON-side position if at least the oil pressure PC2 is input. That is, at the time of any one of the first speed change stage to the fourth speed change stage where, of the oil pressure PC1 and the oil pressure PC2, only the oil pressure PC1 is output so that the clutch C1 is engaged, a state in which the oil pressure PC4 can be input to the second priority engagement valve 108 is set so as to give priority to the supply of the oil pressure PC4 to the clutch C4 over the supply of the oil pressure PB1 to the brake B1. On the other hand, at the time of any one of the fifth speed change stage to the eighth speed change stage where, of the oil pressure PC1 and the oil pressure PC2, at least the oil pressure PC2 is output so that the clutch C2 is engaged, a state in which the oil pressure PB1 can be input to the first priority engagement valve 106 is set so as to give priority to the supply of the oil pressure PB1 to the brake B1 over the supply of the oil pressure PC4 to the clutch C4.

The priority degree switching valve 102 shown in FIG. 6 receives the oil pressure PC1 and the oil pressure PC2. However, it is appropriate that the priority degree switching valve 102 be switchable between the C4ON-side position and the B1ON-side position on the basis of whether the speed change stage at the time of a failure is one of the first to fourth speed change stages or one of the fifth to eighth speed change stages. Therefore, the priority degree switching valve 102 may be a valve that receives only one of the oil pressure PC1 and the oil pressure PC2. In the case where the speed change stage at the time of a failure is the fifth speed change stage, for which the oil pressure PC1 and the oil pressure PC2 are output, the priority degree switching valve 102, if constructed to receive only the oil pressure PC, is switched to the C4ON side corresponding to the first to fourth speed change stages. At the time of a failure in the second group, however, the low speed stage/high speed stage switching valve 104 is switched to the OFF (broken line)-side position, and therefore the priority degree switching valve 102 is switched to the B1ON side corresponding to the fifth to eighth speed change stages.

Thus, the priority degree switching valve 102 constructed as described above suitably changes between the predetermined degrees of priority for supplying one of the oil pressures PC4, PB1 output from the linear solenoid valves SL4, SL5 to a corresponding one of the clutch C4 and the brake B1 at the time of a failure in the second group so as to avoid an event that the fail-safe gear stage established by the fail-safe valve group 100 involves a downshift of two or more stages from the speed change stage maintained immediately prior to the occurrence of the failure, by changing the manner of input of oil pressures to the fail-safe valve group 100, specifically, by changing the manner of input (state of input) of the oil pressure PB1 to the first priority engagement valve 106 and the oil pressure PC4 to the second priority engagement valve 108, on the basis of the state of engagement of at least one (C1 and/or C2) of the engagement devices belonging to the first group, specifically, on the basis of the state of supply of the oil pressure PC1 to the clutch C1 and/or the state of supply of the oil pressure PC2 to the clutch C2.

The switching operation of the hydraulic control circuit 98 at the time of a failure in the second group will be described separately for each speed change stage. However, in the case where the speed change stage at the time of a failure in the second group is the first speed change stage, for which only the clutch C1 is engaged, the failure in the second group results in the establishment of one of the second to fourth speed change stages, and does not cause interlock of the automatic transmission 10. Therefore, the description regarding that case is omitted. In addition to the description regarding the other speed change stages at the time of a failure in the second group, the cases where the ON-failure of the clutch C1 or the clutch C2 occurs will also be described for reference. In the charts of FIGS. 7 to 13, symbol "○" denotes the engaged state, and "○→×" denotes that the engagement device is released at the time of the failure, and "●" denotes that the ON-failure has occurred, and "●●→○" denotes that the engagement device is engaged at the time of occurrence of the ON-failure, and "●→▲" denotes that the engagement device is not engaged at the time of occurrence of the ON-failure, and each blank denotes the released state.

FIG. 7 is a chart illustrating the fail-safe gear stages established by a switching operation of the hydraulic control circuit 98 when a failure in the second group of engagement devices or the ON-failure of the clutch C2 occurs during the second speed change stage. Referring to FIG. 7, if the ON-failure (ON-abnormality) of the clutch C2 occurs, the oil pressure PC2 is input to the low speed stage/high speed stage switching valve 104, so that the spool valve element B104 is urged to the OFF-side position. As a result, the supply of the oil pressure PC1 from the linear solenoid valve SL1 to the clutch C1 via an input port 150 of the low speed stage/high speed stage switching valve 104 is stopped, and the working oil having been supplied to the clutch C1 is discharged to, for example, the atmospheric pressure, via a clutch-side port 152 and a discharge port 154 of the low speed stage/high speed stage switching valve 104. Therefore, the clutch C1 is released and the clutch C2 is engaged. Due to the engagement of the clutch C2 and the engagement of the brake B1, the eighth speed change stage is established as a fail-safe gear stage. Furthermore, if of the failures in the second group, the ON-failure of the clutch C3 occurs, the oil pressure PC3 is input to the second priority engagement valve 108, so that the spool valve element B108 is urged to the OFF-side position. As a result, the supply of the oil pressure PB1 from the linear solenoid valve SL5 to the brake B1 via an input port 156 of the second priority engagement valve 108 is stopped, and the working oil having been supplied to the brake B1 is discharged to, for example, the atmospheric pressure, via a brake-side port 158 and then a discharge port 160 of the second priority engagement valve 108. Therefore, the brake B1 is released and the clutch C3 is engaged. Due to the engagement of the clutch C1 and the engagement of the clutch C3, the third speed change stage is established as a fail-safe gear stage. Thus, the second priority engagement valve 108 gives priority to the supply of the oil pressure PC3 to the clutch C3 over the supply of the oil pressure PB1 to the brake B1. If of the failures in the second group, the ON-abnormality of the clutch C4 occurs, the oil pressure PC4 output from the linear solenoid valve SL4 is supplied, via an input port 162 and a clutch-side port 164 of the first priority engagement valve 106, to an input port 168 of the priority degree switching valve 102 since only the oil pressure PC1 has been input to the priority degree switching valve 102 and, therefore, the spool valve element B102 has been urged to the C4ON (solid line)-side position. The oil pressure PC4 is then output from a priority valve-side port 170 to the second priority engagement valve 108. As the spool valve element B108 is urged to the OFF-side position, the supply of the oil pressure PB1 from the linear solenoid valve SL5 to the brake B1 via the input port 156 of the second priority engagement valve 108 is stopped, and the working oil having been supplied to the brake B1 is discharged to, for example, the atmospheric pressure, via the brake-side port 158 and the discharge port 160 of the second priority engagement valve 108. Therefore, the brake B1 is released and the clutch C4 is engaged. Due to the engagement of the clutch C1 and the engagement of the clutch C4, the fourth speed change stage is established as a fail-safe gear stage. Thus, in the case where the speed change stage at the time of a failure in the second group is a low vehicle speed-side speed change stage, the priority degree switching valve 102 gives priority to the supply of the oil pressure PC4 to the clutch C4 over the supply of the oil pressure PB1 to the brake B1.

FIG. 8 is a chart illustrating the fail-safe gear stages established by a switching operation of the hydraulic control circuit 98 when a failure in the second group of engagement devices or the ON-failure of the clutch C2 occurs during the third speed change stage. Referring to FIG. 8, if the ON-failure (ON-abnormality) of the clutch C2 occurs, the oil pressure PC2 is input to the low speed stage/high speed stage switching valve 104, so that the spool valve element B104 is urged to the OFF-side position. As a result, the supply of the oil pressure PC1 from the linear solenoid valve SL1 to the clutch C1 via the input port 150 of the low speed stage/high speed stage switching valve 104 is stopped, and the working oil having been supplied to the clutch C1 is discharged to, for example, the atmospheric pressure, via the clutch-side port 152 and the discharge port 154 of the low speed stage/high speed stage switching valve 104. Therefore, the clutch C1 is released and the clutch C2 is engaged. Due to the engagement of the clutch C2 and the engagement of the clutch C3, the seventh speed change stage is established as a fail-safe gear stage. Furthermore, if of the failures in the second group, the ON-failure of the clutch C4 occurs, the supply of the oil pressure PC4 from the linear solenoid valve SL4 to the clutch C4 via the input port 162 of the first priority engagement valve 106 is stopped since the oil pressure PC3 has been input to the first priority engagement valve 106 and therefore the spool valve element B106 has been urged to the OFF-side position. Therefore, since the clutch C4 is not engaged, the third speed change stage is maintained as a fail-safe gear stage due to the engagement of the clutch C1 and the engagement of the clutch C3. Thus, the first priority engagement valve 106 gives priority to the supply of the oil pressure PC3 to the clutch C3 over the supply of the oil pressure PC4 to the clutch C4. If of the failures in the second group, the ON-abnormality of the brake B1 occurs, the supply of the oil pressure PB1 from the linear solenoid valve SL5 to the brake B1 via the input port 156 of the second priority engagement valve 108 is stopped since the oil pressure PC3 has been input to the second priority engagement valve 108 and therefore the spool valve element B108 has been urged to the OFF-side position. Therefore, since the brake B1 is not engaged, the third speed change stage is maintained as a fail-safe gear stage due to the engagement of the clutch C1 and the engagement of the clutch C3. Thus, the second priority engagement valve 108 gives priority to the supply of the oil pressure PC3 to the clutch C3 over the supply of the oil pressure PB1 to the brake B1.

FIG. 9 is a chart illustrating the fail-safe gear stages established by a switching operation of the hydraulic control circuit 98 when a failure in the second group of engagement devices or the ON-failure of the clutch C2 occurs during the fourth speed change stage. Referring to FIG. 9, if the ON-failure (ON-abnormality) of the clutch C2 occurs, the oil pressure PC2 is input to the low speed stage/high speed stage switching valve 104, so that the spool valve element B104 is urged to the OFF-side position. As a result, the supply of the oil pressure PC1 from the linear solenoid valve SL1 to the clutch C1 via the input port 150 of the low speed stage/high speed stage switching valve 104 is stopped, and the working oil having been supplied to the clutch C1 is discharged to, for example, the atmospheric pressure, via the clutch-side port 152 and the discharge port 154 of the low speed stage/high speed stage switching valve 104. Therefore, the clutch C1 is released and the clutch C2 is engaged. Due to the engagement of the clutch C2 and the engagement of the clutch C4, the sixth speed change stage is established as a fail-safe gear stage. Furthermore, if of the failures in the second group, the ON-failure of the clutch C3 occurs, the oil pressure PC3 is input to the first priority engagement valve 106, so that the spool valve element B106 is urged to the OFF-side position. As a result, the supply of the oil pressure PC4 from the linear solenoid valve SL4 to the clutch C4 via the input port 162 of the first priority engagement valve 106 is stopped, and the working oil having been supplied to the clutch C4 is discharged to, for example, the atmospheric pressure, via the clutch-side port 164 and the discharge port 166 of the first priority engagement valve 106. Therefore, the clutch C4 is released and the clutch C3 is engaged. Due to the engagement of the clutch C1 and the engagement of the clutch C3, the third speed change stage is established as a fail-safe gear stage. Thus, the first priority engagement valve 106 gives priority to the supply of the oil pressure PC3 to the clutch C3 over the supply of the oil pressure PC4 to the clutch C4. If of the failures in the second group, the ON-abnormality of the brake B1 occurs, the engaged engagement devices do not change. That is, since only the oil pressure PC1 has been input to the priority degree switching valve 102, the spool valve element B102 has been urged to the C4ON (solid line)-side position. Therefore, the oil pressure PC4 output from the linear solenoid valve SL4 has been supplied, via the input port 162 and the clutch-side port 164 of the first priority engagement valve 106, to the input port 168 of the priority degree switching valve 102. The oil pressure PC4 has also been output from the priority valve-side port 170 to the second priority engagement valve 108. Hence, since the spool valve element B108 has been urged to the OFF-side position, the oil pressure PB1 output from the linear solenoid valve SL5 to the input port 156 of the second priority engagement valve 108 is stopped and is not supplied to the brake B1. Therefore, since the brake B1 is not engaged, the fourth speed change stage is maintained as a fail-safe gear stage due to the engagement of the clutch C1 and the engagement of the clutch C4. Thus, in the case where the speed change stage at the time of a failure in the second group is a low vehicle speed-side speed change stage, the priority degree switching valve 102 gives priority to the supply of the oil pressure PC4 to the clutch C4 over the supply of the oil pressure PB1 to the brake B1.

FIG. 10 is a chart illustrating the fail-safe gear stages established by a switching operation of the hydraulic control circuit 98 when a failure in the second group of engagement devices occurs during the fifth speed change stage. Referring to FIG. 10, if of the failures in the second group, the ON-failure (ON-abnormality) of the clutch C3 occurs, the oil pressure PC3 is input to the low speed stage/high speed stage switching valve 104, so that the spool valve element B104 is urged to the OFF-side position. As a result, the supply of the oil pressure PC1 from the linear solenoid valve SL1 to the clutch C1 via the input port 150 of the low speed stage/high speed stage switching valve 104 is stopped, and the working oil having been supplied to the clutch C1 is discharged to, for example, the atmospheric pressure, via the clutch-side port 152 and the discharge port 154 of the low speed stage/high speed stage switching valve 104. Therefore, the clutch C1 is released and the clutch C3 is engaged. Due to the engagement of the clutch C2 and the engagement of the clutch C3, the seventh speed change stage is established as a fail-safe gear stage. Furthermore, if of the failures in the second group, the ON-failure of the clutch C4 occurs, the oil pressure PC4 is input to the low speed stage/high speed stage switching valve 104, so that the spool valve element B104 is urged to the OFF-side position. As a result, the supply of the oil pressure PC1 from the linear solenoid valve SL1 to the clutch C1 via the input port 150 of the low speed stage/high speed stage switching valve 104 is stopped, and the working oil having been supplied to the clutch C1 is discharged to, for example, the atmospheric pressure, via the clutch-side port 152 and the discharge port 154 of the low speed stage/high speed stage switching valve 104. Therefore, the clutch C1 is released and the clutch C4 is engaged. Due to the engagement of the clutch C2 and the engagement of the clutch C4, the sixth speed change stage is established as a fail-safe gear stage. Furthermore, if of the failures in the second group, the ON-failure of the brake 1 occurs, the oil pressure PB1 is input to the low speed stage/high speed stage switching valve 104, so that the spool valve element B104 is urged to the OFF-side position. As a result, the supply of the oil pressure PC1 from the linear solenoid valve SL1 to the clutch C1 via the input port 150 of the low speed stage/high speed stage switching valve 104 is stopped, and the working oil having been supplied to the clutch C1 is discharged to, for example, the atmospheric pressure, via the clutch-side port 152 and the discharge port 154 of the low speed stage/high speed stage switching valve 104. Therefore, the clutch C1 is released and the brake B1 is engaged. Due to the engagement of the clutch C2 and the engagement of the brake B1, the eighth speed change stage is established as a fail-safe gear stage.

FIG. 11 is a chart illustrating the fail-safe gear stages established by a switching operation of the hydraulic control circuit 98 when a failure in the second group of engagement devices or the ON-failure of the clutch C1 occurs during the sixth speed change stage. Referring to FIG. 11, if the ON-failure of the clutch C1 occurs, the supply of the oil pressure PC1 from the linear solenoid valve SL1 to the clutch C1 via the input port 150 of the low speed stage/high speed stage switching valve 104 is stopped since the oil pressure PC2 and the oil pressure PC4 have been input to the low speed stage/high speed stage switching valve 104 and therefore the spool valve element B104 has been urged to the OFF-side position. Therefore, since the clutch C1 is not engaged, the sixth speed change stage is maintained as a fail-safe gear stage due to the engagement of the clutch C2 and the engagement of the clutch C4. Furthermore, if of the failures in the second group, the ON-failure of the clutch C3 occurs, the oil pressure PC3 is input to the first priority engagement valve 106, so that the spool valve element B106 is urged to the OFF-side position. As a result, the supply of the oil pressure PC4 from the linear solenoid valve SL4 to the clutch C4 via the input port 162 of the first priority engagement valve 106 is stopped, and the working oil having been supplied to the clutch C4 is discharged to, for example, the atmospheric pressure, via the clutch-side port 164 and the discharge port 166 of the first priority engagement valve 106. Therefore, the clutch C4 is released and the clutch C3 is engaged. Due to the engagement of the clutch C2 and the engagement of the clutch C3, the seventh speed change stage is established as a fail-safe gear stage. Thus, the first priority engagement valve 106 gives priority to the supply of the oil pressure PC3 to the clutch C3 over the supply of the oil pressure PC4 to the clutch C4. If of the failures in the second group, the ON-abnormality of the brake B1 occurs, the oil pressure PB1 output from the linear solenoid valve SL5 is supplied, via the input port 156 and the brake-side port 158 of the second priority engagement valve 108, to the input port 172 of the priority degree switching valve 102 since the oil pressure PC2 has been input to the priority degree switching valve 102 and, therefore, the spool valve element B102 has been urged to the B1ON (broken line)-side position. The oil pressure PB1 is then output from a priority valve-side port 174 to the first priority engagement valve 106. As the spool valve element B106 is urged to the OFF-side position, the supply of the oil pressure PC4 from the linear solenoid valve SL4 to the clutch C4 via the input port 162 of the first priority engagement valve 106 is stopped, and the working oil having been supplied to the clutch C4 is discharged to, for example, the atmospheric pressure, via the clutch-side port 164 and the discharge port 166 of the first priority engagement valve 106. Therefore, the clutch C4 is released and the brake B1 is engaged. Due to the engagement of the clutch C2 and the engagement of the brake B1, the eighth speed change stage is established as a fail-safe gear stage. Thus, in the case where the speed change stage at the time of a failure in the second group is a high vehicle speed-side speed change stage, the priority degree switching valve 102 gives priority to the supply of the oil pressure PB1 to the brake B1 over the supply of the oil pressure PC4 to the clutch C4.

FIG. 12 is a chart illustrating the fail-safe gear stages established by a switching operation of the hydraulic control circuit 98 when a failure in the second group of engagement devices or the ON-failure of the clutch C1 occurs during the seventh speed change stage. Referring to FIG. 12, if the ON-failure (ON-abnormality) of the clutch C1 occurs, the supply of the oil pressure PC1 from the linear solenoid valve SL1 to the clutch C1 via the input port 150 of the low speed stage/high speed stage switching valve 104 is stopped since the oil pressure PC2 and the oil pressure PC3 have been input to the low speed stage/high speed stage switching valve 104 and therefore the spool valve element B104 has been urged to the OFF-side position. Therefore, since the clutch C1 is not engaged, the seventh speed change stage is maintained as a fail-safe gear stage due to the engagement of the clutch C2 and the engagement of the clutch C3. Furthermore, if of the failures in the second group, the ON-failure of the clutch C4 occurs, the supply of the oil pressure PC4 from the linear solenoid valve SL4 to the clutch C4 via the input port 162 of the first priority engagement valve 106 is stopped since the oil pressure PC3 has been input to the first priority engagement valve 106 and therefore the spool valve element B106 has been urged to the OFF-side position. Therefore, since the clutch C4 is not engaged, the seventh speed change stage is maintained as a fail-safe gear stage due to the engagement of the clutch C2 and the engagement of the clutch C3. Thus, the first priority engagement valve 106 gives priority to the supply of the oil pressure PC3 to the clutch C3 over the supply of the oil pressure PC4 to the clutch C4. If of the failures in the second group, the ON-abnormality of the brake B1 occurs, the supply of the oil pressure PB1 from the linear solenoid valve SL5 to the brake B1 via the input port 156 of the second priority engagement valve 108 is stopped since the oil pressure PC3 has been input to the second priority engagement valve 108 and therefore the spool valve element B108 has been urged to the OFF-side position. Therefore, since the brake B1 is not engaged, the seventh speed change stage is maintained as a fail-safe gear stage due to the engagement of the clutch C2 and the engagement of the clutch C3. Thus, the second priority engagement valve 108 gives priority to the supply of the oil pressure PC3 to the clutch C3 over the supply of the oil pressure PB1 to the brake B1.

FIG. 13 is a chart illustrating the fail-safe gear stages established by a switching operation of the hydraulic control circuit 98 when a failure in the second group of engagement devices or the ON-failure of the clutch C1 occurs during the seventh speed change stage. Referring to FIG. 13, if the ON-failure (ON-abnormality) of the clutch C1 occurs, the supply of the oil pressure PC1 from the linear solenoid valve SL1 to the clutch C1 via the input port 150 of the low speed stage/high speed stage switching valve 104 is stopped since the oil pressure PC2 and the oil pressure PB1 have been input to the low speed stage/high speed stage switching valve 104 and therefore the spool valve element B104 has been urged to the OFF-side position. Therefore, since the clutch C1 is not engaged, the eighth speed change stage is maintained as a fail-safe gear stage due to the engagement of the clutch C2 and the engagement of the brake B1. Furthermore, if of the failures in the second group, the ON-failure of the clutch C3 occurs, the oil pressure PC3 is input to the second priority engagement valve 108, so that the spool valve element B108 is urged to the OFF-side position. As a result, the supply of the oil pressure PB1 from the linear solenoid valve SL5 to the brake B1 via the input port 156 of the second priority engagement valve 108 is stopped, and the working oil having been supplied to the brake B1 is discharged to, for example, the atmospheric pressure, via the clutch-side port 158 and the discharge port 160 of the second priority engagement valve 108. Therefore, the brake B1 is released and the clutch C3 is engaged. Due to the engagement of the clutch C2 and the engagement of the clutch C3, the seventh speed change stage is established as a fail-safe gear stage. Thus, the second priority engagement valve 108 gives priority to the supply of the oil pressure PC3 to the clutch C3 over the supply of the oil pressure PB1 to the brake B1. If of the failures in the second group, the ON-abnormality of the clutch C4 occurs, the engaged engagement devices do not change. That is, since the oil pressure PC2 has been input to the priority degree switching valve 102, the spool valve element B102 has been urged to the B1ON (broken line)-side position. Therefore, the oil pressure PB1 output from the linear solenoid valve SL5 has been supplied, via the input port 156 and the brake-side port 158 of the second priority engagement valve 108, to the input port 172 of the priority degree switching valve 102. The oil pressure PB1 has also been output from the priority valve-side port 174 to the first priority engagement valve 106. Hence, since the spool valve element B106 has been urged to the OFF-side position, the oil pressure PC4 output from the linear solenoid valve SL4 to the input port 162 of the first priority engagement valve 106 is stopped and is not supplied to the clutch C4. Therefore, since the clutch C4 is not engaged, the eighth speed change stage is maintained as a fail-safe gear stage due to the engagement of the clutch C2 and the engagement of the brake B1. Thus, in the case where the speed change stage at the time of a failure in the second group is a high vehicle speed-side speed change stage, the priority degree switching valve 102 gives priority to the supply of the oil pressure PB1 to the brake B1 over the supply of the oil pressure PC4 to the clutch C4.

As described above, according to the embodiment, if a failure in the second group of engagement devices occurs, the manner of input of oil pressures to the fail-safe valve group 100 is changed, specifically, the manner of input (state of input) of the oil pressure PB1 to the first priority engagement valve 106 and the oil pressure PC4 to the second priority engagement valve 108 is changed, on the basis of the state of engagement of at least one (C1 and/or C2) of the engagement devices belonging to the first group, specifically, on the basis of the state of supply of the oil pressure PC1 to the clutch C1 and/or the state of supply of the oil pressure PC2 to the clutch C2, in such a manner that the predetermined degrees of priority for the supply of one of the oil pressures PC4, PB1 output from the linear solenoid valves SL4, SL5 to a corresponding one of the clutch C4 and the brake B1 via the fail-safe valve group 100 are changed so as to avoid an event that the fail-safe gear stage established by the fail-safe valve group 100 at the time of the failure in the second group involves a downshift of two or more stages from the speed change stage maintained immediately prior to the occurrence of the failure. Therefore, desired degrees of priority are set corresponding to the cases where a low vehicle speed-side speed change stage has been established and the cases where a high vehicle speed-side speed change stage has been established, so as to substantially prevent the occurrence of an uncomfortable behavior of the vehicle caused by the shift to a fail-safe gear stage that is established by the fail-safe valve group 100 in order to prevent the occurrence of interlock of the automatic transmission 10.

While the embodiments of the invention have been described in detail with reference to the drawings, the invention is also applicable in other manners.

For example, in the foregoing embodiment, the priority degree switching valve 102 changes the manner of input (state of input) of the oil pressure PB1 to the first priority engagement valve 106 and the oil pressure PC4 to the second priority engagement valve 108 to change between the degrees of priority of the supply of the oil pressure PC4 to the clutch C4 and the supply of the oil pressure PB1 to the brake B1, by receiving at least one of the oil pressure PC1 and the oil pressure PB1. However, it is also possible to change the manner of input of the oil pressures and thereby change between the degrees of priority of the supplies thereof by changing between the output of the oil pressure PB1 to the first priority engagement valve 106 and the output of the oil pressure PC4 to the second priority engagement valve 108 on the basis of an electrical signal from at least one oil pressure switch that outputs a predetermined signal, for example, an ON-signal PON, if a predetermined pressure for generating the engagement torque on the clutch C1, C2, or by changing between the state where the oil pressure PB1 can be input to the first priority engagement valve 106 and the state where the oil pressure PC4 can be input to the second priority engagement valve 108 on the basis of an electrical signal from at least one oil pressure switch as described above.

Incidentally, what have been described above are mere illustrative embodiments of the invention, and the invention can be embodied with various modifications and improvements on the basis of the knowledge of those of ordinary skill in the art.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A hydraulic control apparatus of a vehiclular automatic transmission which has two friction engagement devices belonging to a first group and a plurality of friction engagement devices belonging to a second group, and which is caused to establish a plurality of speed change stages of different speed change ratios by either one of an event of simultaneous engagements of the two friction engagement devices belonging to the first group and an event of simultaneous engagements of one of the friction engagement devices belonging to the first group and one of the friction engagement devices belonging to the second group, and which is caused to establish one of low vehicle speed-side speed change stages having greater speed change ratios than a predetermined speed change stage by engaging one of the friction engagement devices belonging to the first group and selectively engaging one of the friction engagement devices belonging to the second group, or is caused to establish one of high vehicle speed-side speed change stages having smaller speed change ratios than the predetermined speed change stage by engaging another one of the friction engagement devices belonging to the first group and selectively engaging one of the friction engagement devices belonging to the second group, the hydraulic control apparatus comprising:
  a fail-safe device to which oil pressures for engaging the friction engagement devices belonging to the second group are input, and which, if there occurs a failure where an oil pressure that causes simultaneous engagements of friction engagement devices belonging to the second group is output, stops supply of an oil pressure to a friction engagement device other than a priority-given friction engagement device belonging to the second group so that an oil pressure is output to the priority-given friction engagement device in accordance with predetermined degrees of priority, so as to establish one of the low vehicle speed-side speed change stages provided that a low vehicle speed-side speed change stage was established prior to the failure, and so as to establish one of the high vehicle speed-side speed change stages provided that a high vehicle speed-side speed change stage was established prior to the failure; and
  a switching device that changes a manner of input of the oil pressures to the fail-safe device and thereby change the degrees of priority based on a state of engagement of at least one friction engagement device belonging to the first group.

2. The hydraulic control apparatus of the vehicular automatic transmission according to claim 1, wherein the automatic transmission is formed by a planetary gear type multi-stage transmission in which a gear stage is changed by selectively coupling rotating elements of a plurality of planetary gear devices via hydraulic friction engagement devices.

3. The hydraulic control apparatus of the vehicular automatic transmission according to claim 1, wherein the friction engagement devices are controlled by duty control of an ON-OFF solenoid.

4. The hydraulic control apparatus of the vehicular automatic transmission according to claim 1, wherein the fail-safe device comprises a low speed stage/high speed stage switching valve, a first priority engagement valve that stops supply of an oil pressure to a friction engagement device other than a priority-given friction engagement device belonging to the second group so that an oil pressure is output to the priority-given friction engagement device, and a second priority engagement valve that stops supply of an oil pressure to a friction engagement device other than another priority-given friction engagement device belonging to the second group so that an oil pressure is output to the another priority-given friction engagement device.

5. The hydraulic control apparatus of the vehicular automatic transmission according to claim 1, wherein the switching device changes the degrees of priority so that the speed change stage established by the fail-safe device when the failure occurs does not involve a downshift of two or more stages from the speed change stage maintained immediately prior to occurrence of the failure.

6. The hydraulic control apparatus of the vehicular automatic transmission according to claim 5, wherein the switching device comprises a priority degree switching valve.

7. The hydraulic control apparatus of the vehicular automatic transmission according to claim 1, wherein a hydraulic control of the automatic transmission is controlled by a linear solenoid valve, and an output oil pressure of the linear solenoid valve is supplied to each of the friction engagement devices.

8. The hydraulic control apparatus of the vehicular automatic transmission according to claim 7, wherein one linear solenoid valve is provided corresponding to each one of the friction engagement devices.

* * * * *